UNITED STATES PATENT OFFICE.

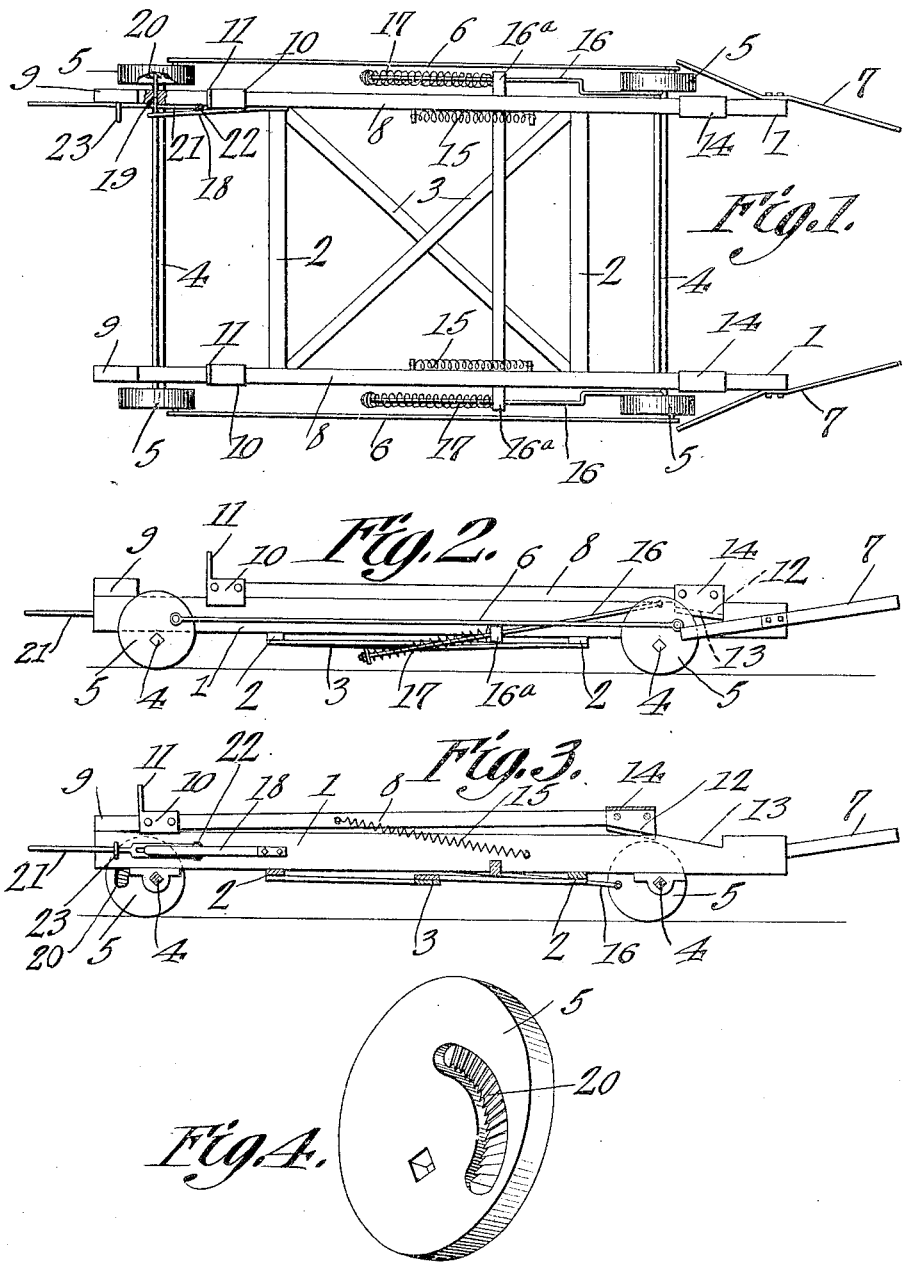

ARBANNES S. ALBRIGHT, OF GAINESVILLE, FLORIDA.

AUTOMOBILE-JACK.

1,131,891.  Specification of Letters Patent.  Patented Mar. 16, 1915.

Application filed August 7, 1914. Serial No. 855,678.

*To all whom it may concern:*

Be it known that I, ARBANNES S. ALBRIGHT, a citizen of the United States, residing at Gainesville, in the county of Alachua and State of Florida, have invented a new and useful Automobile-Jack, of which the following is a specification.

The present invention appertains to automobile jacks, and is particularly an improvement over the automobile jack disclosed in a co-pending application filed April 13, 1914, Serial No. 831,606.

The present invention contemplates the provision of an automobile jack of unique construction which is adapted to set within the garage or other storehouse in which the automobile is kept, and onto which the automobile may be run, to raise the automobile off of the floor in a convenient and desirable manner, to thereby relieve the pneumatic tires of the weight of the machine, which is desirable for obvious reasons.

It is also within the scope of this invention, to provide an automobile jack of the nature indicated, which will be improved generally in its construction, to enhance the utility thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing wherein:—

Figure 1 is a plan view of the improved jack, portions being broken away. Fig. 2 is a side elevation of the jack in normal or idle position. Fig. 3 is a longitudinal section of the jack illustrating the same in position for raising or elevating the automobile. Fig. 4 is an enlarged perspective view of that supporting wheel which is provided with the chamfered notches or ratchet.

In carrying out the present invention, there is provided a truck embodying a body or frame including the parallel side beams or sills 1 connected by the cross pieces or bars 2 and the diagonal braces 3. Front and rear axles 4 are journaled to the forward and rear end portions of the beams or sills 1, and supporting wheels 5 are secured eccentrically to the extremities of the axles 4, whereby when the truck is moved, the eccentrically supported wheels 5 will cause the body or frame of the truck to move upwardly and downwardly. The front and rear wheels 5 are operatively connected at each side of the truck by connecting rods or links 6, which constrain the forward and rear wheels 5 to rotate in unison so that the body or frame of the truck will always be parallel with the floor.

The forward end of the truck carries a guide whereby the automobile may be run properly onto the jack, and to this end, a pair of bars 7 are secured intermediate their ends to the forward ends of the beam or sills 1, and have their forward ends converging in front of the body or frame and have their rear ends diverging in advance of and toward the outer sides of the front wheels 5, as clearly seen in Fig. 1. In this manner, the guide bars 7 will serve to enable the automobile to be properly run onto the jack, since the guide bars 7 being engaged by the automobile wheels, will tend to aline the jack with the automobile.

Slidably mounted upon the beams or sills 1 are two longitudinal slide bars 8, which are shorter in length than the beams or sills 1 and which are normally slid forward from the rear ends of the beams 1. The rear ends of the beams 1 have upstanding stops 9 against which the rear ends of the bars 8 are adapted to strike or abut when the bars are moved rearward. The rear ends of the bars 8 are guided upon the beams 1, by inverted U-shaped plates 10 secured over the rear ends of the bars 8 and straddling the beams 1, the rear ends of the plates 10 having upturned ears or striking members 11 against which the front axle of the automobile is adapted to impinge when the automobile is run over the jack for raising the machine. In order to raise the forward ends of the bars 8, when the bars are slid rearwardly, to thereby cause the forward ends of the bars 8 to engage the rear axle of the automobile, the forward ends of the bars 8 are provided with lower inclined portions 12 which rest and slide upon upper inclines 13 provided upon the forward end portions of the beams 1. The forward ends of the bars 8 are guided properly upon the inclines 13, by means of inverted U-shaped plates 14 secured over the forward ends of the bars 8 and straddling the beams 1. The bars 8 are normally slid forwardly when the jack is idle, by means of coiled wire retractile springs 15 connecting the bars 8 and the beams 1, the springs 15 being preferably disposed upon the inner sides of the said bars and beams.

In order to limit and retard the rearward movement of the truck, when the automobile is run thereonto, pitmen 16 are pivotally connected to the front wheels 5, and have their intermediate portions slidable through ears or lugs 16ª outstanding from the beams 1, and coiled wire retractile springs 17 connect the free ends of the pitmen 16 and the ears or lugs 16ª, whereby the springs 17 will be brought under tension as the wheels 5 move rearwardly.

A locking device is employed for holding the jack in elevated or raised position, and to this end a leaf spring 18 is secured to the inner side of one beam 1, and has a pawl or dog 19 projecting from its free end and slidable through the said beam 1 to engage an arcuate ratchet or series of chamfered notches 20 provided upon the inner face of the corresponding rear wheel 5. The spring 18 is adapted to force the pawl or dog 19 into engagement with the arcuate ratchet 20, to lock the corresponding rear wheel against forward movement when the jack has been backed up to raise the machine. Since all of the wheels 5 are connected to move in unison, the locking device will serve to hold all of the wheels against reverse movement after the machine has been jacked up. As a means for releasing the pawl or dog 19, a lever 21 is hinged to the corresponding beam 1, as at 22, between the leaf spring 18 and the said beam, and the said lever 21 works within a guide 23 carried by the said beam beyond the free end of the spring 18. The guide 23 serves to limit the movement of the lever 21, to prevent the withdrawal of the pawl or dog 19 from the corresponding beam, it being noted that when the lever 21 is swung inwardly, it will swing the spring 18 inwardly to retract the pawl or dog 19 out of engagement with the ratchet 20, and to thereby enable the wheels 5 to roll forwardly.

Ordinarily, when the jack is idle, the bars 8 will be slid forwardly to normal position, as seen in Fig. 2, under the influence of the springs 15, and the wheels 5 will be rolled forwardly under the influence of the springs 17 exerting pressure upon the pitmen 16 to move the truck to normal lowered position as seen in Fig. 2. Now, when the automobile or motor vehicle is run over the jack, this being facilitated by the guide bars 7, the front axle of the machine will strike the ears or projections 11 and will thus cause the bars 8 to be slid rearwardly, and as a result the forward ends of the bars 8 will be raised upon the inclines 13 of the beams 1, to cause the forward ends of the said bars to engage the rear axle of the machine. Then, when the rear ends of the bars 8 strike the stops 9, the truck will be moved rearwardly and as a result, the wheels 5 will be rolled in such a manner as to raise the truck and to thereby elevate the machine off of the floor. The rearward movement of the truck is arrested and limited due to the fact that when the forward wheels 5 roll rearwardly, the pitmen 16 being actuated thereby will bring the springs 17 under considerable tension for this purpose. The truck is held in raised position due to the engagement of the pawl or dog 19 with the ratchet 20 of the corresponding rear wheel 5, which will prevent the truck from moving forwardly under the weight of the automobile or machine. In this manner, the automobile may be readily run onto the jack and elevated to relieve the pneumatic tires of the weight of the machine, which is of advantage in lengthening the life of the tires, although the jack may be employed for raising the machine for the purposes of repair, cleaning, or the like. When it is desired to lower the machine onto the floor, it is only necessary to release the pawl or dog 19 from the ratchet 20, by swinging the lever 21 inwardly, and this will enable the truck to move forwardly under the weight of the machine. The machine will then run onto the floor off of the jack, and the jack will immediately return to its normal position as above intimated.

From the foregoing, taken in connection with the drawing, it will be obvious that the present jack is entirely automatic for jacking up the machine when the machine is run onto the jack, and that the machine may be readily let onto the floor by releasing the pawl or dog 19. The other advantages and attributes of the present invention will be obvious to those versed in the art, without further comment being deemed necessary.

Having thus described the invention, what is claimed as new is:—

1. A jack comprising a truck including a frame and supporting wheels connected eccentrically thereto, and a locking device carried by the frame and coöperable with one of the said wheels for holding the truck in raised position.

2. A jack comprising a truck including a frame and supporting wheels connected eccentrically thereto, a locking device carried by the frame and coöperable with one of the said wheels for holding the truck in raised position, and means connecting the frame and one of the said wheels for returning the truck to lowered position.

3. In a jack, a truck embodying a frame and supporting wheels connected eccentrically thereto, locking means carried by the frame and coöperable with one of the said wheels for holding the truck in raised position, a pitman pivotally connected to one of the said wheels, the frame having a portion through which the pitman is slidable, and a spring connecting the said portion and pitman and adapted to be brought under tension when the truck is raised.

4. In a jack, a truck embodying a frame having side beams, front and rear axles journaled to the beams, and supporting wheels secured eccentrically to the terminals of the axles, links connecting the supporting wheels at the opposite sides, a locking device carried by one of the said beams, and coöperating with one of the rear wheels for holding the truck in raised position, pitmen pivotally connected to the front supporting wheels, the said beams having outstanding portions through which the pitmen are slidable, and springs connecting the said portions and pitmen and adapted to be brought under tension when the truck is raised.

5. In a jack, a truck embodying a frame and supporting wheels connected eccentrically thereto, means carried by the frame and coöperating with one of the said wheels for locking the truck in raised condition, bars slidable upon the frame and having portions at one end to be engaged by the axle of an automobile, the said frame and bars having coöperating means for raising the bars when they are slid and for limiting the movement of the bars, and springs connecting the said bars and frame for returning the bars to normal position.

6. In a jack, a truck comprising a frame having side beams, axles journaled to the said beams, and supporting wheels secured eccentrically to the terminals of the axles, locking means carried by one of the said beams and coöperable with one of the said wheels for holding the truck in raised position, bars slidable upon the beams, the bars having upstanding striking portions at their rear ends to be engaged by an axle of an automobile, the rear ends of the beams having stops to be engaged by the bars, the forward ends of the bars having lower inclined portions and the beams having inclines upon which the said inclined portions rest, and springs connecting the said bars and beams for returning the bars to normal position.

In testimony that I claim the foregoing as my own, I have hereto affixed my signature in the presence of two witnesses.

ARBANNES S. ALBRIGHT.

Witnesses:
S. L. WOODARD,
J. J. CAIN.

Copies of this patent may be obtained for five cents each, by addressing the "Commissioner of Patents, Washington, D. C."